US007614683B2

(12) United States Patent
Roccato et al.

(10) Patent No.: US 7,614,683 B2
(45) Date of Patent: Nov. 10, 2009

(54) IMPACT PROTECTION STRUCTURE

(75) Inventors: Maurizio Roccato, Moncalieri (IT); Paolo Canato, Candiolo (IT)

(73) Assignee: Ford Global Technologies, LLC

(*) Notice: Subject to any disclaimer, the term of this patent is extended or adjusted under 35 U.S.C. 154(b) by 320 days.

(21) Appl. No.: 11/530,126

(22) Filed: Sep. 8, 2006

(65) Prior Publication Data
US 2007/0063543 A1    Mar. 22, 2007

(30) Foreign Application Priority Data
Sep. 8, 2005    (EP) ................... 05019525

(51) Int. Cl.
*B60R 19/02*    (2006.01)
(52) U.S. Cl. ................ 296/187.03
(58) Field of Classification Search ........... 296/187.03, 296/187.12, 193.06, 193.07, 203.03, 209; 293/102, 126, 154, 155
See application file for complete search history.

(56) References Cited
U.S. PATENT DOCUMENTS

| 3,888,502 | A |   | 6/1975  | Felzer et al. |
|-----------|---|---|---------|----------------------------|
| 4,097,080 | A | * | 6/1978  | Petry ................... 293/134 |
| 4,109,367 | A | * | 8/1978  | Richard, Jr. ............. 29/436 |
| 4,272,114 | A | * | 6/1981  | Hirano et al. ........... 293/133 |
| 5,150,935 | A | * | 9/1992  | Glance et al. ........... 293/136 |
| 5,782,525 | A | * | 7/1998  | Honma et al. ......... 296/187.12 |
| 5,820,204 | A | * | 10/1998 | Masuda et al. ........ 296/187.12 |
| 5,954,390 | A | * | 9/1999  | Kleinhoffer et al. .... 296/203.01 |
| 6,254,172 | B1 | * | 7/2001 | Takahara ............... 296/187.05 |
| 6,554,350 | B2 | * | 4/2003 | Takahara ............... 296/187.05 |
| 6,676,200 | B1 |   | 1/2004 | Peng |
| 6,857,692 | B2 | * | 2/2005 | Cardimen et al. .......... 296/204 |
| 7,029,044 | B2 | * | 4/2006 | Browne et al. ............ 293/137 |
| 7,077,460 | B2 | * | 7/2006 | Czaplicki et al. ....... 296/187.02 |
| 7,264,302 | B2 | * | 9/2007 | Nagashima ............ 296/187.12 |
| 2004/0104602 | A1 | * | 6/2004 | Cardimen et al. .......... 296/204 |
| 2006/0145490 | A1 | * | 7/2006 | Yamaguchi et al. ........ 293/109 |
| 2007/0052260 | A1 | * | 3/2007 | Lassl et al. ............ 296/187.12 |
| 2007/0096507 | A1 | * | 5/2007 | Brunner et al. ......... 296/187.12 |
| 2007/0152474 | A1 | * | 7/2007 | Lassl et al. ............ 296/187.12 |

FOREIGN PATENT DOCUMENTS

| GB | 2 325 509 A   |   | 11/1998 |
|----|---------------|---|---------|
| JP | 08239057 A    | * | 9/1996  |
| JP | 10007021 A    | * | 1/1998  |
| JP | 11005565 A    | * | 1/1999  |
| JP | 11099967 A    | * | 4/1999  |
| JP | 2007196748 A  | * | 8/2007  |

* cited by examiner

*Primary Examiner*—H Gutman
(74) *Attorney, Agent, or Firm*—Kristy Joi Downing, Esq.

(57) ABSTRACT

There is provided an impact protection structure for providing impact energy absorption at a region substantially between a first transverse strengthening member and a second substantially upright strengthening member of a road vehicle. In operation, the first and second members are disposed substantially mutually perpendicularly. The impact protection structure comprises an energy absorbing block arrangement and a cover arrangement for maintaining the absorbing block arrangement substantially in position during impact. In operation, the impact protection structure is susceptible to reducing lateral damage to the road vehicle in crash or impact situations, thereby potentially increasing passenger and driver safety.

15 Claims, 9 Drawing Sheets

IMPACT PROTECTION STRUCTURE

TECHNICAL FIELD

The present invention relates to impact protection structures for road vehicles, for example to lateral impact protection structures. Moreover, the present invention also relates to component parts included in such protection structures. Furthermore, the invention relates to methods of absorbing impact energy in road vehicles provided with such impact protection structures.

BACKGROUND OF THE INVENTION

In contemporary road vehicles, for example automobiles, personal safety has become an increasingly important issue to drivers and passengers of such vehicles. Of particular concern regarding safety is damage resulting from frontal vehicle impacts and lateral vehicle impacts. Whereas vehicles can be designed to better cope with frontal impacts, for example by using crumple zones in engine compartments as well as restraining features such as airbags, optimization of vehicles to cope with lateral impacts is technically difficult in that sides of vehicles do not provide much space for accommodating energy-absorbing structures. However, when road accident statistics are analyzed, many personal injuries arise from lateral collisions to vehicles, hence lateral impact or crash mitigation is an important issue. It is found in practice that sports utility vehicles (SUVs) and similar vehicles having a relatively elevated chassis height are susceptible in crash situations to causing considerable lateral damage to vehicles having a relatively lower chassis height, for example, modern compact vehicles.

Various approaches have been conventionally adopted for improving lateral crash protection in vehicles. For example, in a published European patent application no. EP 1 134 148, there is described a frame structure for a vehicle. The frame structure is purported to be capable of increasing collision energy absorption and includes a floor member with extruded side sill members which are adapted to undergo a lateral buckling response to side collisions while resisting axial or longitudinal deformation due to end-on collisions. The sill members are orientated with their elongate axes substantially running from a front region of the vehicle to a rear region thereof.

As a further example of conventional approaches to coping with lateral impact in vehicles, a published United Kingdom patent application no. GB 2 392 652 describes side-panel occupant protection. In such protection, a vehicle side door comprises an inner trim panel, an outer panel and a pusher block arrangement. The pusher block arrangement is aligned with a pelvic region of an occupant of the vehicle. Moreover, the pusher block arrangement is operable to be displaced towards the occupant if the outer panel is deformed due to a side impact. An air bag is provided for inflation into a region between the trim panel and the pelvic region of the occupant so as to transfer the load, in an impact, from the pusher block arrangement to the occupant for moving the occupant away from the door. Optionally, the pusher block arrangement comprises two separate components, namely an inner block and an outer block. The blocks are optionally fabricated from an energy-absorbing material such as a foam.

Although such conventional approaches for coping with lateral impact to vehicles may provide benefit, they are not always capable of providing the desired degree of protection in contemporary vehicles, for example in open-top vehicles, against lateral damage capable of being inflicted by sport utility vehicles (SUVs) and similar vehicles of relatively elevated chassis height. The challenge of providing improved protection against lateral impact represents a technical problem.

Thus, the present invention is concerned with providing an at least partial solution to this problem of providing better lateral vehicle protection, for example against lateral side impact from SUVs.

SUMMARY OF THE INVENTION

An object of the invention is to provide an improved lateral impact protection structure for use in road vehicles, for example against lateral damage caused by SUVs and similar types of vehicle.

According to a first aspect of the present invention, an impact protection structure for providing impact energy absorption at a region substantially between a first strengthening member and a second strengthening member of a road vehicle is disclosed. The impact protection structure comprises an energy absorbing block arrangement and a cover arrangement for maintaining the absorbing block arrangement substantially in position during impact. The cover arrangement comprises a strengthening element for focusing in operation an impact force borne by the first member during impact substantially at a center of the absorbing block arrangement. The first member being is a substantially horizontal transverse structural member of the vehicle and the second member is a substantially upright strengthening structure of the vehicle. The protection structure is operable to provide the vehicle with side impact protection for impact forces directed substantially along an elongate axis of the first member.

One advantage of the present invention is the combination of the energy absorbing block arrangement in cooperation with the cover arrangement which is capable of providing improved side impact energy absorption, and hence potentially increased passenger and driver safety.

The impact protection structure may preferably comprise of a energy absorbing block arrangement which is operable to undergo substantially non-elastic deformation in absorbing kinetic energy associated with the impact forces. Non-elastic deformation is beneficial for absorbing relatively greater amounts of kinetic energy by non-reversible crushing of pores or microvoids included in the absorbing block arrangement.

Preferably, the impact protection structure is adapted to provide impact energy absorption when the first and second members are disposed substantially mutually perpendicularly. For example, such a disposition of strengthening members is found in open-top vehicles where transverse strengthening members are abutted to upright structures forming frames for doors.

In a preferred embodiment of the impact protection structure, the strengthening element may be implemented as a bracket of substantially "L"-shape cross-sectional profile.

In one embodiment, the energy absorbing block arrangement may comprise a single unitary energy absorber block adapted to be mounted in the region between an end of the first member and to extend to within the second member. The use of a unitary block lends itself to simplifying the fabrication of the vehicle. For example, the unitary block may also include a projection adapted to locate into an aperture provided at the end of the first member to assist to maintain the unitary block in position to absorb impact energy during crash or impact situations.

In another embodiment, the absorbing block arrangement includes a first energy absorbing block adapted to occupy a region between an end of the first member and a side of the second member and provide an abutment there between, and a second energy absorbing block adapted to be located within the second member substantially adjacent to the first energy absorbing block. Such an arrangement for the first and second blocks is capable in operation of providing more effective impact energy absorption, especially into the second block, as illustrated for example, in FIG. 7b.

The second energy absorbing block may be adapted to be located so that its center is at a height substantially similar to a height of an upper peripheral edge of the first member whereat it is coupled via the first block to the second member, the peripheral edge being subject to a concentration of impact forces during impact situations. Such a disposition of the protection structure provides enhanced impact energy absorption.

The protection structure comprises a cover arrangement which may be adapted to be maintained in position within the vehicle by way of fasteners. Such mounting avoids heating the blocks during installation which could potentially degrade their impact energy absorption properties. Moreover, a use of fasteners enables the covers to be just sufficiently retained for keeping the blocks in position during impact but nevertheless deforming under impact as illustrated for example, in FIG. 7b. In a preferred embodiment, the cover arrangement is adapted to be retained in operation by the fasteners at peripheral edges thereof.

In one embodiment of the cover arrangement, it is fabricated from sheet metal which is cut and bent into required forms. Preferably, the cover arrangement and the absorber block arrangement are at least in part fabricated to be an integral component.

The absorbing block arrangement comprises energy absorbing blocks which may be fabricated from one or more of: a polyolefin, such as a polyethylene and a polypropylene; a styrene resin such as polystyrene; an ABS resin; a polyester resin such as a polyethylene terephthalate and a polyamide; and a polypropylene. Such materials are operable to provide energy absorbing characteristics, especially when implemented as expanded plastics material foam with a multiplicity of gas or air cavities therein.

Moreover, such expanded materials may include substantially open pores therein. Alternatively, such expanded materials can include substantially closed pores therein.

In another alternative embodiment of the protection structure, the energy absorbing block arrangement includes at least one block having a generally tapered form, the tapered form being thickest where in operation the at least one block abuts onto the second member and thinnest where in operation the at least one block abuts onto an end of the second member. For example, such a tapered form renders the tapered block with optimal energy absorbing characteristics at its thicker end and yet not contributing unnecessarily to weight of the vehicle.

The arrangement of absorbing blocks may include a second absorbing block adapted to be mounted onto a mounting ridge within the second member. Such a manner of mounting the second block is convenient during mass production of vehicles including the protection structure.

The first and second members may be further provided with a sill member disposed substantially perpendicularly to the first and second members, the protection structure being operable to cooperate with the sill member, the first member and the second member during impact or crash situations.

According to a second aspect of the present invention, a chassis for a vehicle is provided, which including at least one impact protection structure.

According to a third aspect of the invention, a method of absorbing impact energy in a road vehicle, the vehicle including an impact protection structure for providing impact energy absorption at a region between a first strengthening member and a second strengthening member of the vehicle. The impact protection structure comprises an energy absorbing block arrangement and a cover arrangement for maintaining the absorbing block arrangement substantially in position during impact. The first member being a substantially horizontal transverse structural member of the vehicle, and the second member being a substantially upright strengthening structure of the vehicle, the method comprises the steps of receiving lateral impact forces at the vehicle in a crash or impact situation; and concentrating the lateral impact forces using the cover arrangement into the energy absorbing block arrangement to cause the block arrangement to deform so as to absorb kinetic energy associated with the impact forces.

It will be appreciated that features of the invention are susceptible to being combined in any combination without departing from the scope of the invention as defined by the appended claims.

BRIEF DESCRIPTION OF THE DRAWINGS

By way of example only, embodiments of the invention will now be described with reference to the accompanying drawings wherein.

DETAILED DESCRIPTION OF PREFERRED EMBODIMENTS

In order to provide contemporary vehicles with sufficient strength to withstand impacts and crashes at relatively higher vehicle speeds, it is conventional practice in vehicle design to employ strengthening sills and hollow elongate members in vehicle bodies. The hollow elongate members are fabricated from metal sheet which is folded and then welded during manufacture. Such hollow elongate members are not only of relatively lighter weight, but are axially strong and can, in worst case such as a severe crash, provide desirable crumpling characteristics when deformed; such crumpling is capable of absorbing impact kinetic energy. In advanced vehicle design, it is beneficial not only to include elongate strengthening members in an axial direction in a vehicle body, namely substantially aligned from a front end of the body to a rear end thereof, but also in a transverse direction so as to provide the vehicle with improved characteristics for coping with lateral impacts. Such transverse strengthening members are either additional parts or are formed from existing vehicle components, for example by providing a transverse indented ridge in a vehicle metal floor panel to provide such a transverse strengthening member.

Figure 1A:
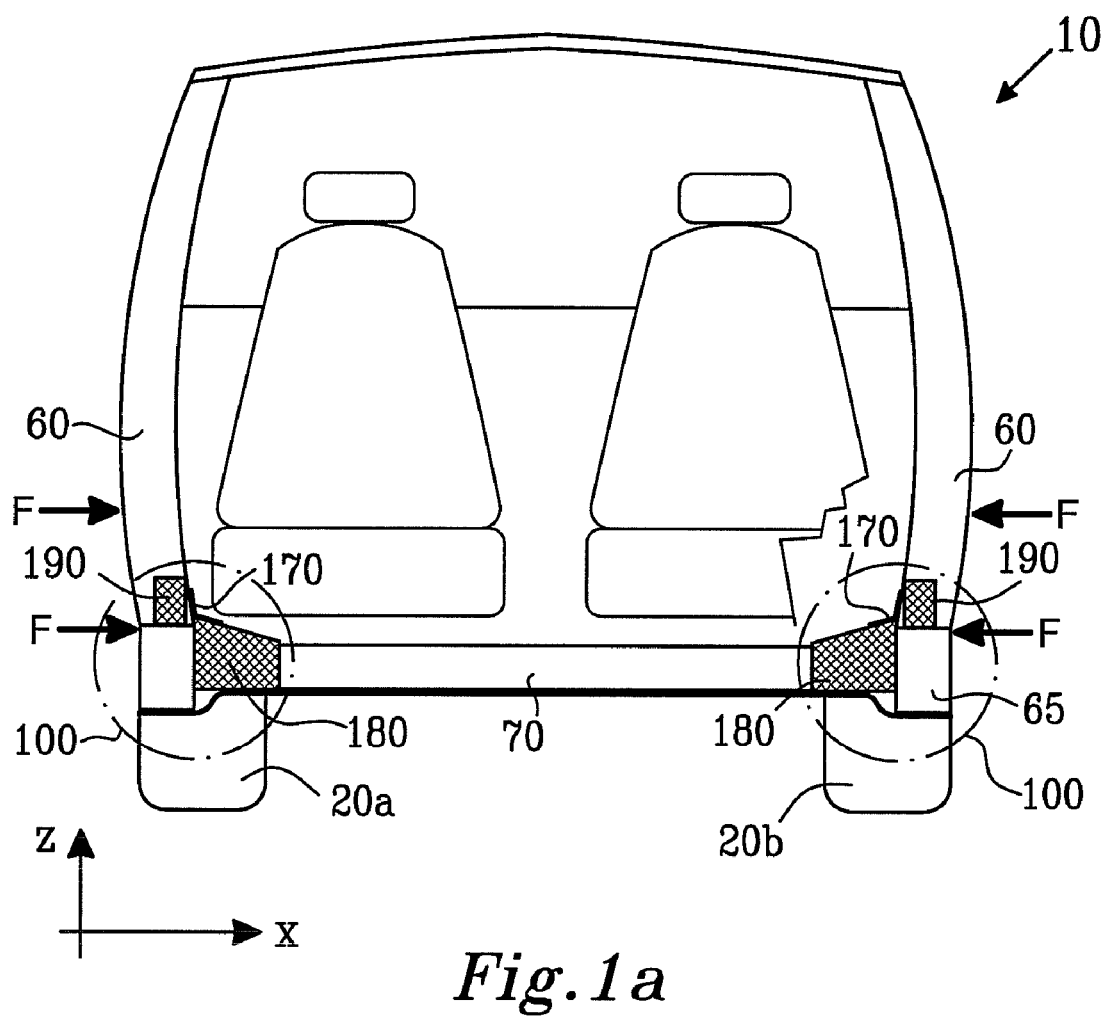
FIGS. 1a, 1b are schematic end and plan views of a vehicle provided with two lateral strengthening sills, with a transverse member, and two substantially vertically-orientated strengthening structures.
Figure 1B:
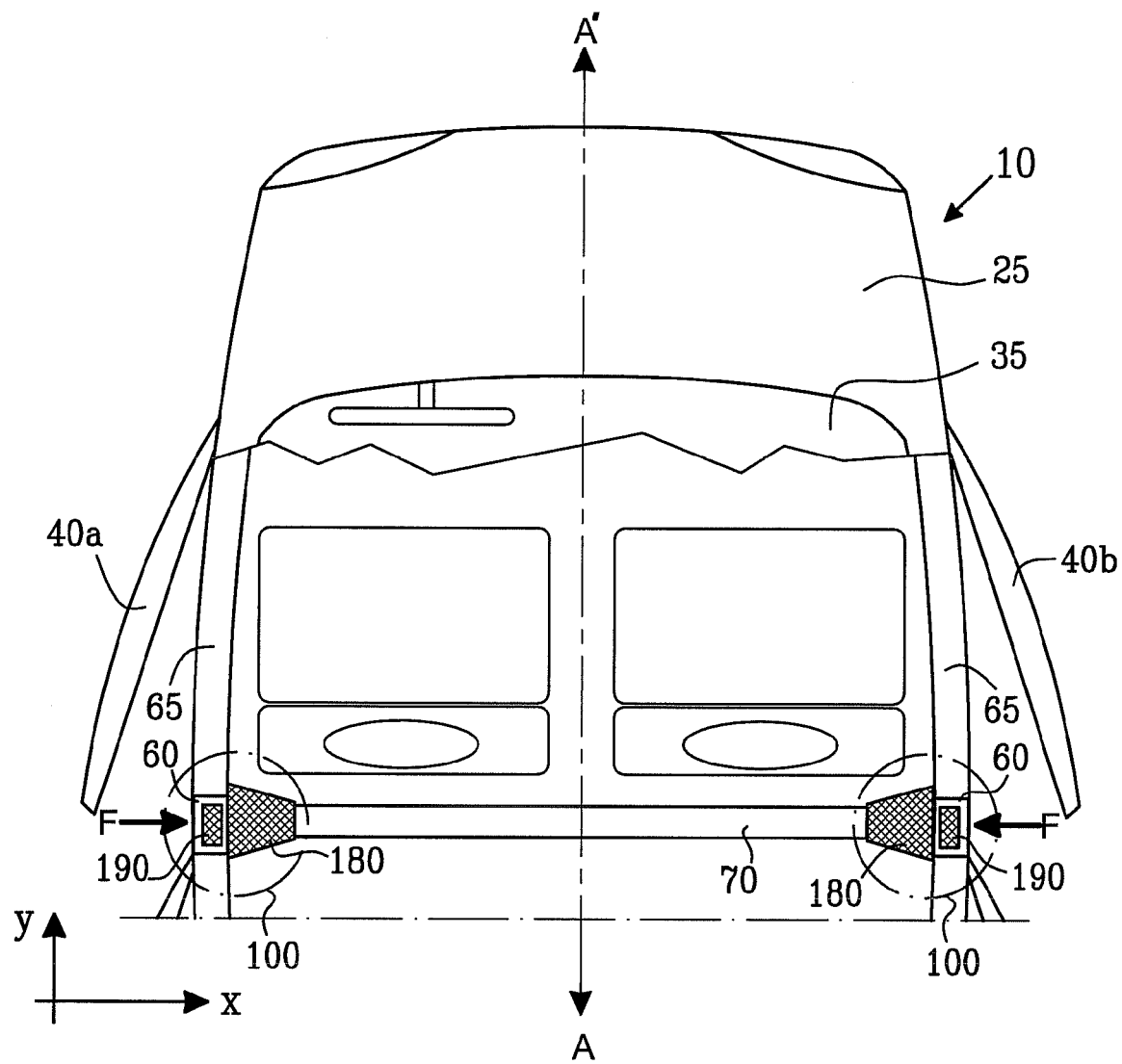

Inclusion of such a transverse strengthening member is illustrated in FIGS. 1a and 1b; FIGS. 1a and 1b are views whose perspective are denoted by axes X, Y, Z shown. In FIGS. 1a and 1b, there is illustrated a vehicle indicated generally by 10. The vehicle 10 includes four wheels, for example wheels 20a, 20b, mounted via bearings and suspension to a chassis 25. At a front end of the chassis 25 is mounted an engine coupled to one or more of the wheels. The chassis 25 is further provided with a windscreen 35, two front doors 40a, 40b, and optionally two rear doors. The vehicle 10 is optionally open-top, in a manner akin to an open-top sports car, although it can alternatively include a permanent metal roof. The front end and a rear end of the vehicle 10 define a principal axis A-A' of the vehicle 10, the principal axis A-A' being substantially parallel to a surface plane of a road surface (not shown) on which the vehicle 10 is operable to travel. At side regions of the vehicle 10 whereat side impacts can potentially occur in operation, there are included substantially vertically-orientated strengthening structures denoted by 60; the vertically-orientated strengthening structures conveniently form at least part of "B-pillars" of the vehicle 10. The strengthening structures 60 can be bodywork parts of the chassis 25, especially when the chassis 25 is of generally welded form. Moreover, the chassis 25 also beneficially includes strengthening sills 65 along side edge peripheries of the vehicle 10. The vehicle 10 also includes a transverse member 70, for example mounted or integral to a floor of the vehicle 10, for providing the vehicle 10 with lateral rigidity. The transverse member 70 is optionally formed using folded and welded metal sheet in a manner as elucidated in the foregoing.

The transverse member 70 is operable to provide lateral rigidity and, in extreme crash situations, to crumple to absorb impact kinetic energy. Of particular concern for the present invention is characteristics of regions denoted by 100 under lateral impact conditions wherein a force F is applied to the strengthening structures 60, for example in a situation when a sports utility vehicle (SUV) crashes or impacts onto the vehicle 10. It is important in the regions 100 that forces arising under impact conditions are correctly coupled to the transverse member 70 and also at least partially absorbed in order to improve survival of a driver and passengers, if present, in the vehicle 10.

Figure 2:
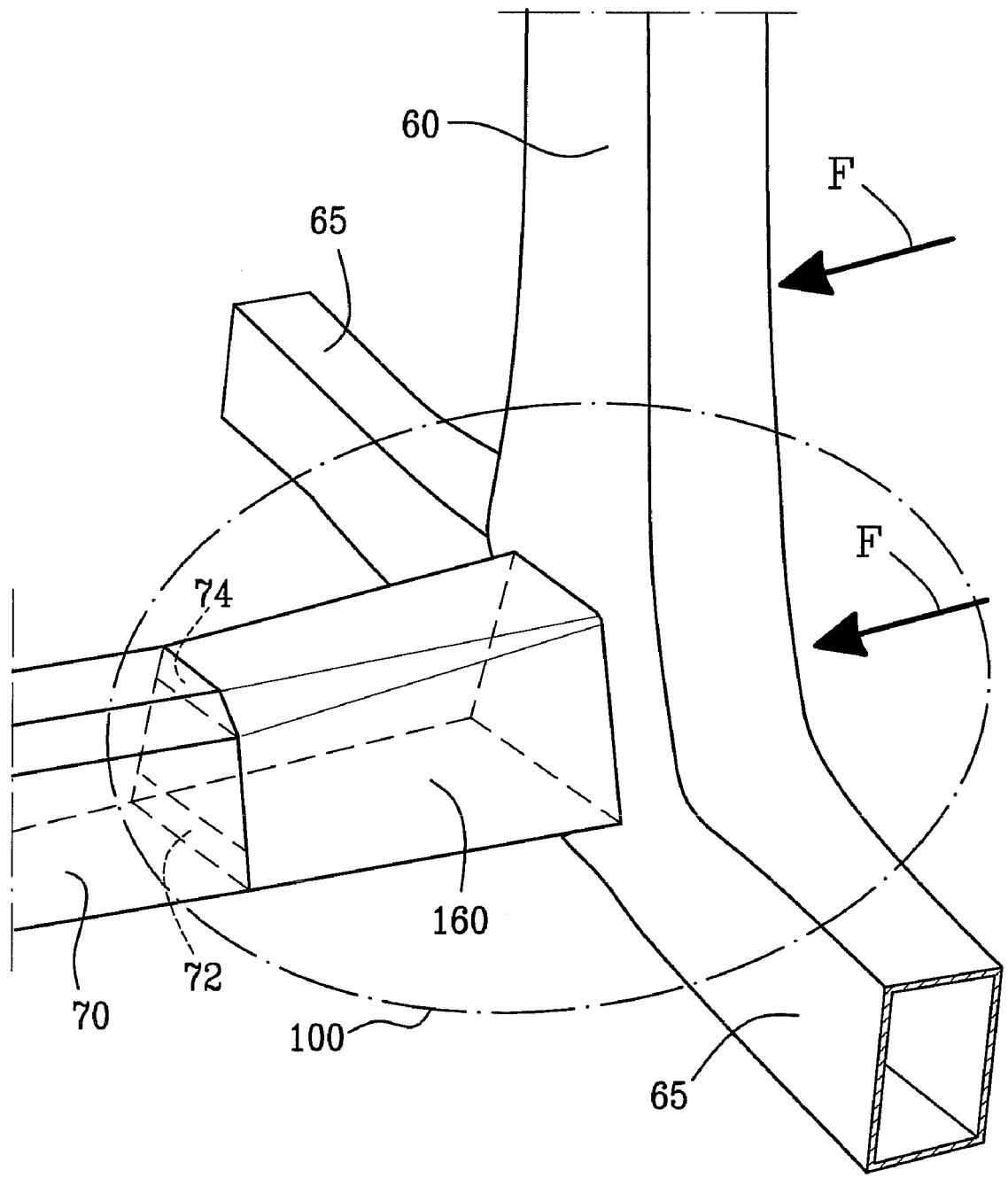
FIG. 2 is a schematic illustration of an interface region of the vehicle of FIGS. 1a and 1b, whereat a substantially vertically-orientated strengthening structure and a lateral strengthening sill mutually abut, and an end of the traverse member via a first absorber block is coupled to the strengthening structure.

The region 100 is illustrated in greater detail in FIG. 2 in schematic form. The strengthening structure 60 extends substantially vertically upwards a distance, for example, in a range of 150 to 200 mm from a floor height of the vehicle 10. The strengthening structure 60 is, for example, a lower part of a door frame surround of the vehicle 10, the door frame surround accommodating a door 40 of the vehicle 10; for example, the structure 60 is susceptible to forming a part of a "B-pillar" of the vehicle 10. Moreover, the region 100 includes an assembly according to the present invention in a vicinity of where the transverse member 70 meets via a first expanded plastics material foam energy absorber block the strengthening structure 60 and the aforementioned strengthening sill 65. The assembly is represented only schematically in FIG. 2; in practice, the assembly comprises the aforesaid first expanded plastics material foam energy absorber block interposed between an end region of the transverse member 70 and the strengthening structure 60 and the sill 65 and held in place by a metal cover. The end region of the transverse member 70 is provided with one or more abutment surfaces 72, 74 for spreading impact of crash forces experienced by the first expanded plastics material foam block; the abutment surfaces 72, 74 at least partially cover an end area of the transverse member 70. Moreover, the abutment surfaces 72, 74 are susceptible to being implemented by welding one or more metal sheets to the end of the transverse member 70, or by bending flaps of metal integral to the transverse member 70 to form the abutment surfaces 72, 74.

The aforesaid metal cover itself has a further strengthening bracket at an upper region thereof; the strengthening bracket can either be an additional component to the cover, or it can be integral with the cover, for example by way of a portion of the cover being folded back onto itself and spot welded to form a region of double metal thickness to provide the bracket in integral form. Moreover, in conjunction with the assembly, a second expanded plastics material foam energy absorber block is included adjacent the end of the transverse member 70 within a wall of the vehicle 10 whereat the strengthening structure 60 and the strengthening sill 65 intersect. The metal cover is optionally attachable to the vehicle 10 by way of bolts at its extremities; similarly, the strengthening bracket is also optionally maintained in position by way of bolts at its extremities. Use of bolts avoids a need for welding the metal cover and the strengthening bracket into position in the region 100. The assembly illustrated in FIG. 2 will now be further elucidated with reference to FIGS. 3a and 3b.

Figure 3A:
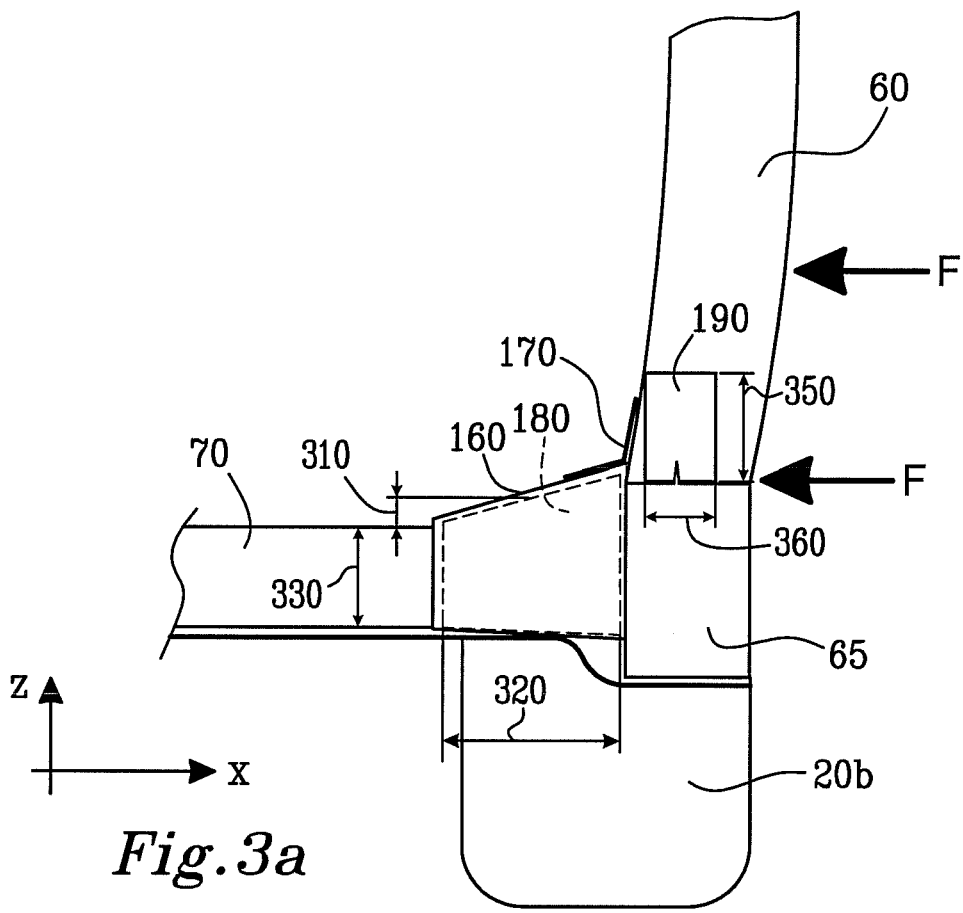
FIGS. 3a, 3b are side and plan schematic illustrations of the interface region of FIG. 2, the interface region being provided with a cover, a strengthening bracket, a first absorber block and a second absorber block.
Figure 3B:
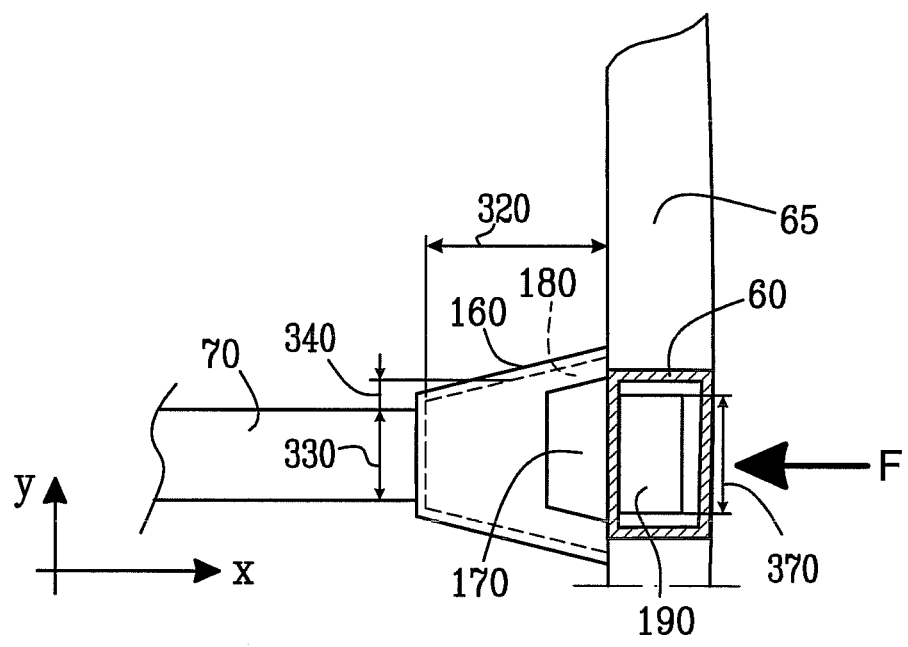

In FIGS. 3a and 3b, the metal cover is denoted by 160. The cover 160 is fabricated from sheet metal by stamping or laser cutting processes to generate a flat blank; the flat blank is then bent or pressed to form it into a required cover shape. The further strengthening bracket is denoted by 170. The bracket 170 is also fabricated from sheet metal by stamping or laser cutting to provide a flat blank; the flat blank is similarly bent or pressed to form it into a required bracket shape. The cover 160 and its bracket 170 are of a generally tapered form as illustrated, namely widening out towards a junction of the sill 65 and the strengthening structure 60. Housed within the cover 160 is the first energy absorber block denoted by 180, the first block 180 optionally also being of tapered form as illustrated, namely cooperating with the cover 160 and widening out towards the junction of the sill 65 and the strengthening structure 60. Within a region of the aforesaid junction is housed the second absorber block denoted by 190. The second block 190 is positioned at a relatively greater height in the region 100 in comparison to the first block 180. The bracket 170 is effective at holding the first block 180 in position during lateral impact conditions. Moreover, the cover 160 is also designed to deform easily under impact conditions but nevertheless hold the first absorber block 180 in position during such impact conditions.

The first block 180 is optionally of an approximately cubic form when installed in the vehicle 10, and conforming substantially in end cross-section to an internal cross-sectional area of the transverse member 70. Moreover, the block 180 may be an integral component; alternatively, it can comprise a plurality of parts which are co-assembled.

The blocks 180, 190 serve to contribute to the global stiffness of the chassis 25 of the vehicle 10. Moreover, the blocks 180, 190 are optionally fabricated from expanded plastics material foam, the material foam being derived from for example:

(a) a polyolefin, such as a polyethylene and a polypropylene;

(b) a styrene resin such as polystyrene;

(c) an ABS resin;

(d) a polyester resin such as a polyethylene terephthalate and a polyamide;

(e) a polypropylene.

For example, the blocks 180, 190 are beneficially fabricated from expanded polypropylene (EPP) plastics material having a density in a range of 80 grammes/litre to 100 grammes/litre, and more preferably substantially 91 grammes/litre. Such expanded polypropylene plastics material foam has a compressive strength of 0.69 MPa for 25% strain, 0.93 MPa for 50% strain, and 2.08 MPa for 75% strain. Moreover, such expanded polypropylene foam has a tensile strength of substantially 0.97 MPa, and a tear strength of 4.4 grammes/millimeter. During manufacture of the blocks 180, 190, polypropylene resin is combined with other ingredients in a multi-step process, wherein extruded pellets of polypropylene are expanded to become consistently shaped expanded beads which are then subsequently injected into multi-cavity aluminum molds; pressure and heat are applied to fuse the expanded beads into finished shapes for the blocks 180, 190. Alternatively, the blocks 180, 190 can be fabricated from expanded metal foam with voids therein; for example, the blocks 180, 190 can be fabricated from expanded aluminum foam including microvoids therein. The microvoids optionally have a nominal diameter in a range of 1 μm to 1 mm, and more optionally in a range of 500 μm to 10 μm.

The plastics material foam includes air or gas voids therein to provide a foam material which is relatively light in weight, is strong and also exhibits desired energy absorbing characteristics when being deformed under impact conditions. Moreover, the plastics material foam can be either of substantially open or closed pore nature. The pores optionally have a nominal diameter in a range of 1 μm to 1 mm, and more optionally in a range of 500 μm to 10 μm.

Thus, the aforesaid blocks 180, 190 are operable to absorb kinetic energy by way of elastic deformation. In more extreme impact situations, the blocks 180, 190 are susceptible to undergoing substantially non-elastic deformation in which walls of pores or microvoids therein become crushed during impact to absorb kinetic energy.

If desired, the aforesaid plastics material foam, similarly the expanded metal foam, can have a composition, for example density, which is spatial variable within the blocks 180, 190, for example to increase their potential energy-absorbing performance in impact and crash situations.

As elucidated in the foregoing, it will be appreciated that the transverse member 70 is optionally rendered integral with the floor of the vehicle 10.

Figure 4:
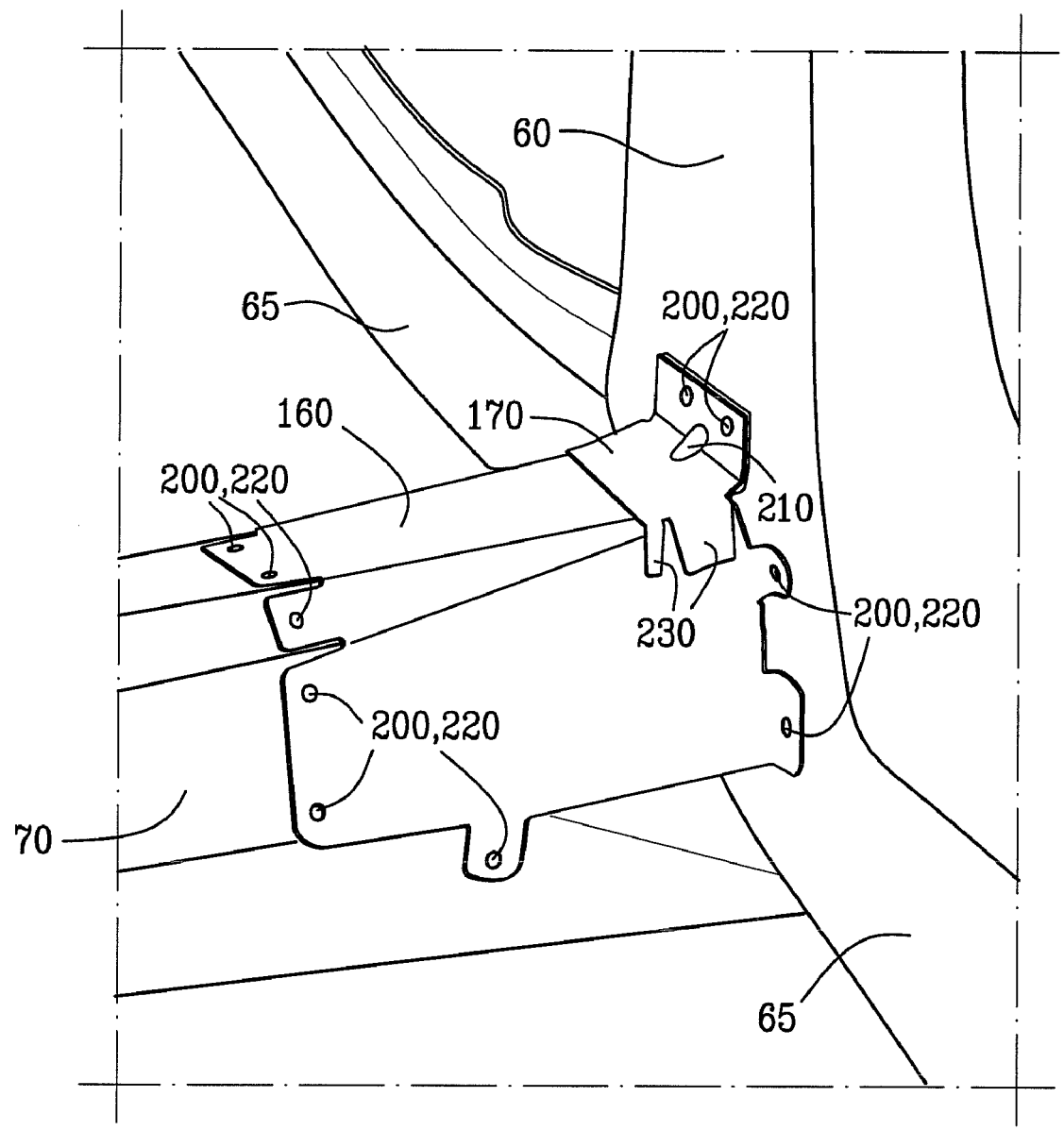
FIG. 4 is a line-diagram representation of a photographic image showing the interface region of FIGS. 2, 3a and 3b in perspective view, the line diagram representation showing the cover with its bolt holes at extremities thereof mounted onto the transverse member, and the strengthening member mounted onto the cover at an upper region thereof.
Figure 5:
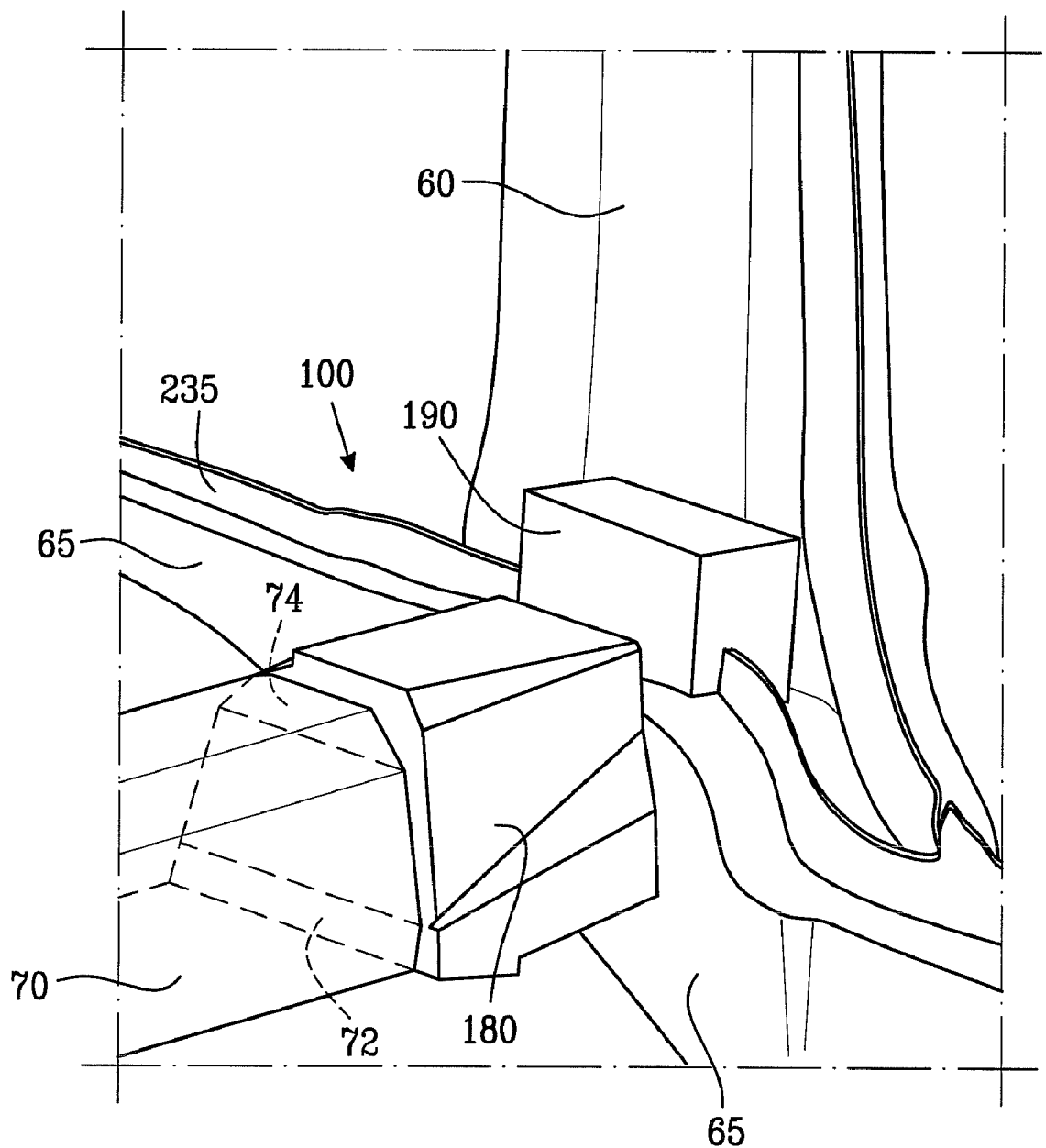
FIG. 5 is a line-diagram representation of a photographic image showing the first and second absorber blocks included at the interface region, the first absorber block mounting at an end of the transverse member and the second absorber member mounting at the substantially vertically-orientated strengthening structure; it is to be noted that some of the vertically-orientated strengthening structure is omitted from the illustration to show the second absorber block more clearly; moreover, the cover and the strengthening bracket are also not shown to improve clarity.
Figure 6:
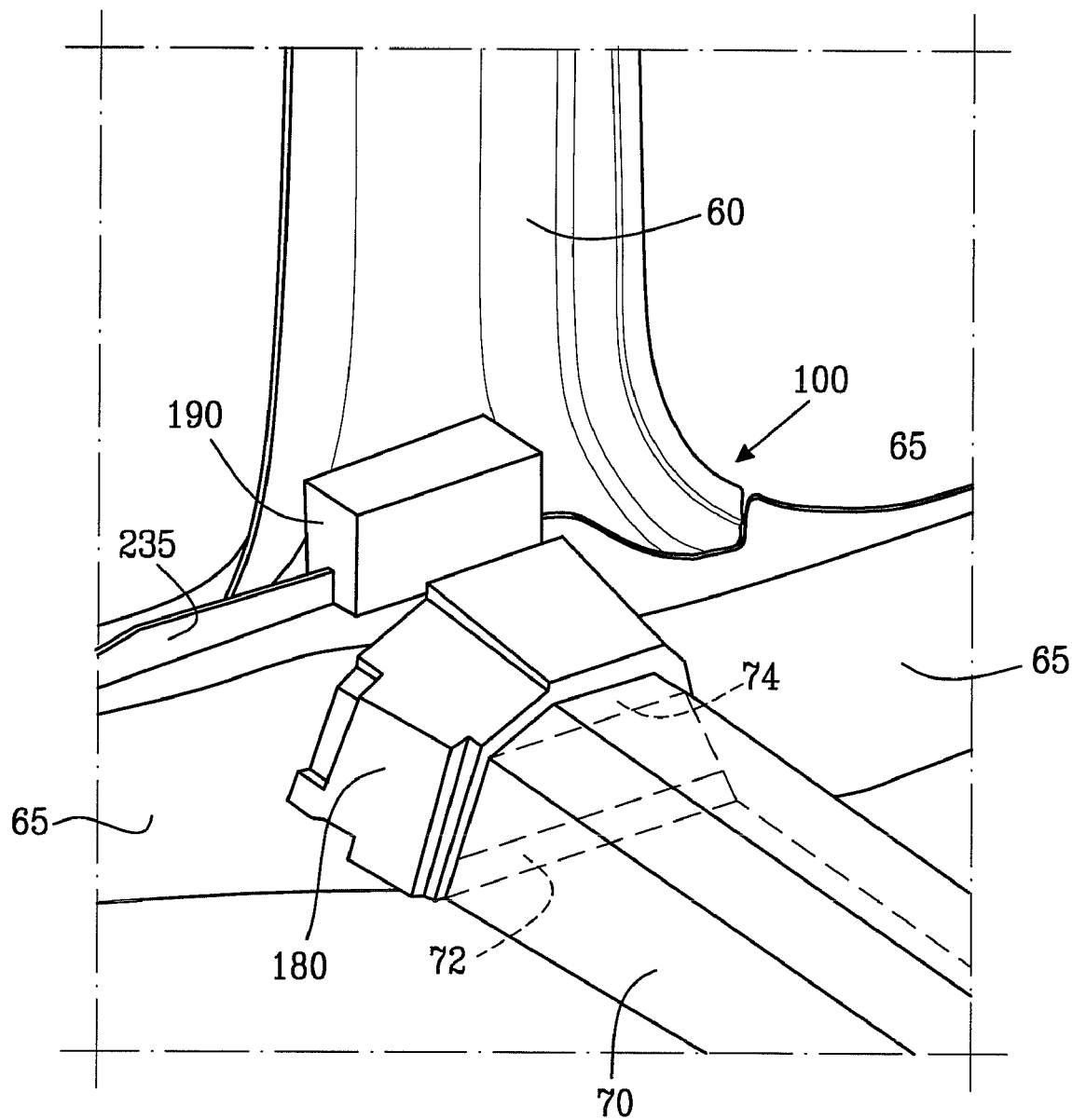
FIG. 6 is another line-diagram representation of a photographic image showing, from another perspective to FIG. 5, the first and second absorber blocks included within the interface region.

More specific details of the cover 160 and the bracket 170 will now be elucidated with reference to FIGS. 4 to 6. In FIG. 4, there is provided an outline diagram of the region 100 derived from a photographic-type image. As illustrated, the cover 160 includes fastening holes 200 at its extremes for accommodating fasteners operable to secure the cover 160 to the transverse member 70, to the sill 65 and also to the strengthening member 60; the fastening holes 200 are susceptible to receiving fasteners such as bolts, rivets, press-studs, screws or similar types of fastening components denoted by 220. As elucidated in the foregoing, the first absorber block 180 is not shown in FIG. 4 on account of being hidden from view beneath the cover 160. The bracket 170 is attached by way of its fastening holes 200 at an upper region of the cover 160 as illustrated. Optionally, the bracket 170 includes a central raised indent ridge 210 to further increase its mechanical strength. Moreover, the bracket 170 is generally of substantially right-angled "L"-shape cross-sectional profile as illustrated. The bracket 170 is optionally not itself fastened to the cover 160. Moreover, the bracket 170 includes lateral portions 230 thereof which are bent during manufacture so as to engage onto sides of the cover 160, thereby potentially reducing a tendency for the cover 160 to move laterally in respect of an elongate axis of the transverse member 70 during lateral impact conditions; these lateral portions 230 are present at both sides of the bracket 170. The strengthening bracket 170 is optionally fabricated from thicker sheet metal than employed to fabricate the cover 160. Optionally, the cover 160 and the bracket 170 can be provided during manufacturer of the vehicle 10 as an integral component; for example, the cover 160 can be spot welded or otherwise permanently adjoined to the bracket 170. As a further option, at least one or the cover 160 and the bracket 170 can be integrally molded into the first block 180 so as to provide a unitary component for handling during manufacture of the vehicle 10.

In FIG. 5, there is provided an outline diagram of the region 100 derived from a photographic-type image. The cover 160 and the strengthening bracket 170 together with a portion of the substantially-vertical strengthening assembly 60 are shown removed so that the first and second absorber blocks 180, 190 are to be more clearly seen. As elucidated earlier, the second absorber block 190 is mounted in the region 100 at a height relatively higher than that of the first absorber block 180 for reasons that will become evident from FIGS. 7a and 7b. In FIG. 6, there is provided a further outline diagram of the region 100 also derived from a photographic-type image. The first absorber block 180 is shown in a region between the end of the transverse member 70 and the sill 65 and its associated strengthening structure 60. Optionally, the first absorber block 180 has an outer surface disposed in a facetted manner, namely with a top facet, two diagonal facets, and two side facets. The two diagonal facets are included between the top facet and the side facets as illustrated. The first absorber block 180 is of generally cubic form with an overall length along a direction of a longitudinal axis of the transverse member 70 when installed of substantially 300 mm, a height of substantially 200 mm and a width of substantially 200 mm. The second absorber block 190 is of generally rectangular or substantially cubic form; optionally, the second absorber block 190 has approximate dimensions of substantially 200 mm (length)×130 mm (height)×100 mm (depth), although other sizes are possible therearound. The second absorber block 190 is optionally arranged to be mounted, by way of a linear slot formed along a lower surface of the block 190, onto a metal ridge 235 forming a part of the sill 65 where it intersects with the strengthening structure 60.

Figure 7A:
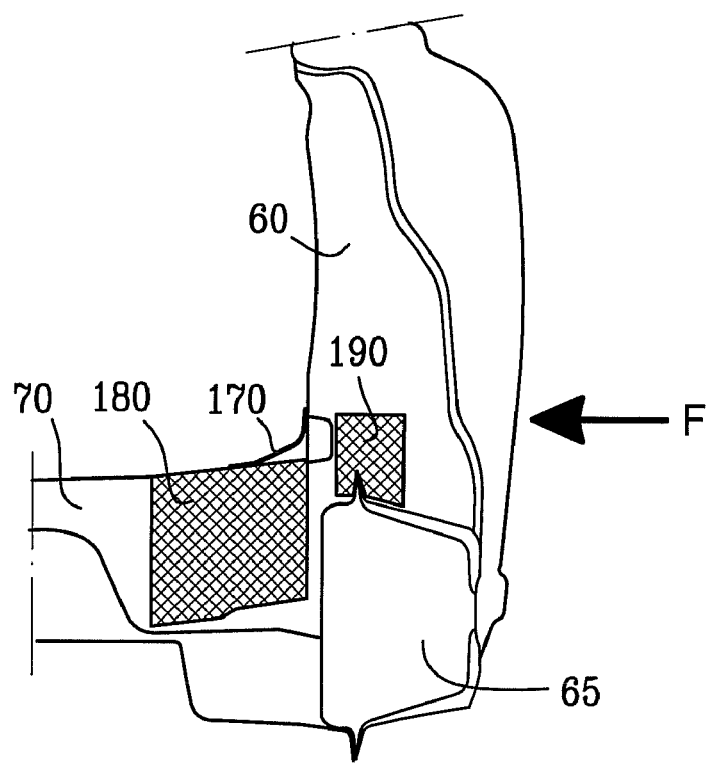
FIGS. 7a, 7b include two cross-sectional views of the interface region before and after being subjected to a lateral impact denoted by a lateral force F, the views showing deformation of the substantially vertically-orientated strengthening structure, as well as the aforesaid first and second absorber blocks.
Figure 7B:
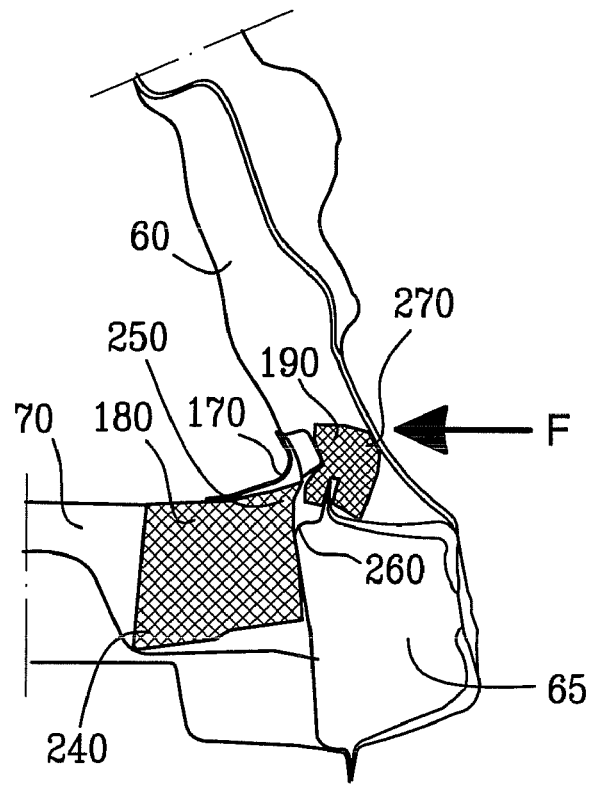

Referring to FIGS. 7a and 7b, deformation of the region 100 when subjected to the lateral impact or crash force F is illustrated in lateral cross-sectional view. In FIG. 7a, the region 100 is shown in an undeformed state, namely the absorber blocks 180, 190 are in their manufactured form, and the strengthening structure 60 is implemented as a cavity surrounded by contoured metal sheets and has its metal sheets mutually spaced apart. A position of application of the aforesaid impact or crash force F is shown as being substantially aligned to a top of the second absorber block 190.

In FIG. 7b, the region 100 is shown in a deformed state after application of the force F. Metal sheets of the strengthening member 60 are shown pushed together. The sill 65 is shown slightly rotated around its principal axis causing deformation of the first absorber block 180 whereat a base region 240 of the block 180 most remote from the sill 65 is pushed towards a center of the vehicle 10. Moreover, an upper region 250 of the first absorber block 180 is compressed by an upper edge 260 of the sill 65. Moreover, the second block 190 experiences considerable deformation on account of the metal sheets of the strengthening structure 60 being pushed into the block 190, thereby flattening one of its corners 270. Moreover, forces applied to the second block 190 by the crash or impact are transferred to the upper region 250 of the first block 180 with the strengthening bracket 170 functioning to focus the force from the crash or impact. Such focusing by the bracket 170 enables the first block 180 to absorb the forces rather than them being transferred to the transverse member 70. It will be appreciated that the bracket 170 is included in a strategically beneficial position whereat a considerable turning moment from the strengthening structure 60 is generated under crash or impact situations. In relation to the sill 65, it will be appreciated that the first and second blocks 180, 190 are especially well placed to provide impact energy absorption, the second block 190 providing most significant crash energy absorption and the first block 180 assisting to prevent buckling and crumpling at the end of the transverse member 70.

It will be appreciated that the first and second blocks 180, 190 together with their cover 160 and strengthening bracket 170 are optionally included at both ends of the transverse member 70 as illustrated in FIGS. 1a and 1b. Optionally, the second block 190 can be omitted, thereby relying on the first block 180 to provide impact or crash energy absorption.

The assembly included within the region 100, for example as described in the foregoing, is also conveniently referred to collectively as a lateral impact protection structure. The lateral impact protection structure is beneficial to employ in open-top vehicles, for example cabriolets. Moreover, the lateral impact protection structure is beneficial to employ to resist damage arising from impacts from SUVs (sport utility vehicles) and similar relatively high vehicles, for example vans and lorries. However, the protection structure is also susceptible to being used in other types of road vehicle where personal safety is important, for example in busses and coaches, where lateral impact or crash mitigation is important in view of the length of such types of road vehicle rendering them especially vulnerable to lateral damage. Even sports utility vehicles (SUVs) are susceptible to incorporating the present invention to provide side impact protection therein, for example to provide protection against side impact from lorries or trucks.

The plastics material foam blocks 180, 190 can either be maintained in position by securing them using the cover 160 and the strengthening bracket 170, or by providing the foam blocks 180, 190 with projections, slots or similar features which ensure that they remain in position during impact or crash situations for effectively absorbing impact energy. Optionally, the cover 160 and the strengthening bracket 170 can be integrally molded in the first block 180 to provide a unitary component when fabricating the vehicle 10; such an implementation of the first block 180 is susceptible to providing fewer parts to co-assemble, thereby potentially rendering fabrication more rapid.

Figure 8A:
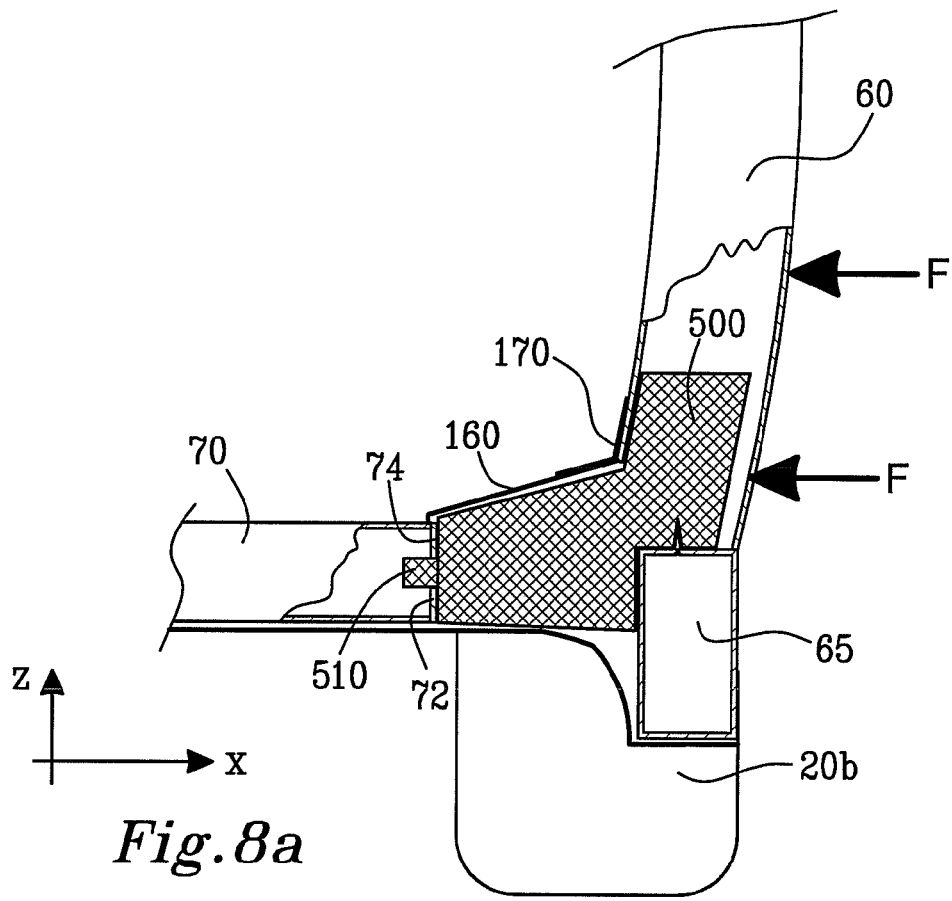
FIGS. 8a, 8b provide side and plan views respectively of a unitary absorber block included within the vehicle of FIG. 1 to provide energy absorption during impact or crash situations.
Figure 8B:
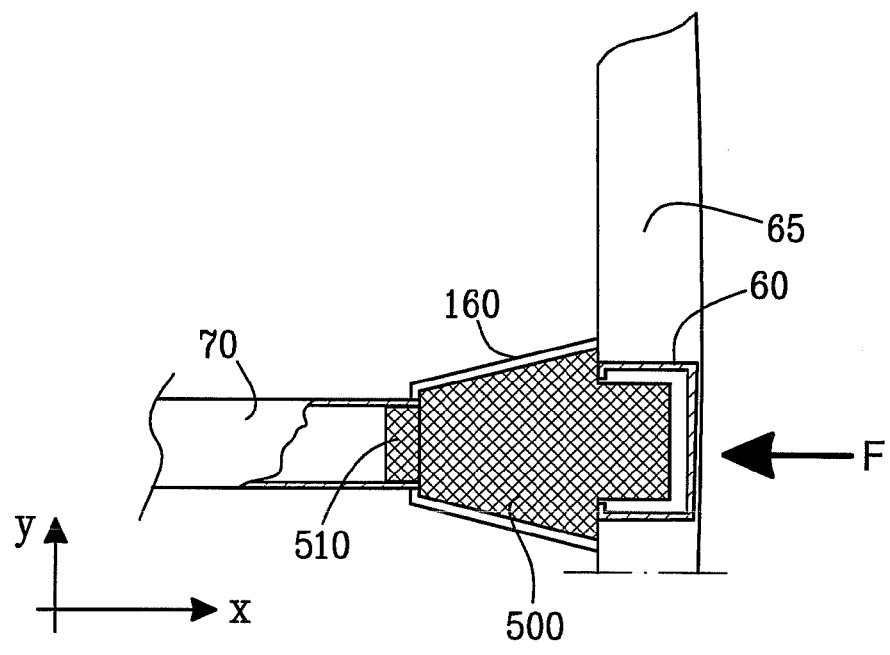

Optionally, the first and second blocks 180, 190 can be combined together to provide a unitary block adapted to extend in operation from the end of the transverse member 70 into the strengthening structure 60 as depicted in FIGS. 8a and 8b. In FIGS. 8a, 8b, the unitary block is denoted by 500 and includes a projection 510 for engaging into the end of the transverse member 70 as illustrated, namely into an aperture adjacent to the aforesaid abutment surfaces 72, 74. The projection 510 is operable to maintain the block 500 in position during impact or crash situations such that the cover 160 and the strengthening bracket 170 can optionally be omitted. The block 500 is adapted to engage onto the central raised indent ridge 235 as illustrated to provide a positive retention thereto. On account of the strengthening member 60 being rotated under lateral impact conditions as depicted in FIGS. 7a, 7b, the unitary block 500 is effectively captured into position during impact or crash situations, namely rendering it possible to optionally omit one of more of the cover 160 and the strengthening bracket 170.

It will be further appreciated that embodiments of the invention described in the foregoing are susceptible to being modified without departing from the scope of the invention as claimed by the accompanying claims.

Numerals included within parentheses in the accompanying claims are included to assist appreciation of subject matter claimed in the accompanying claims and are not intended to limit scope of the claims.

Expressions such as "comprise", "include", "consist of", "incorporate", "have" and "is" are intended to be construed non-exclusively, namely such expressions do not exclude other components, items or elements being present which are not explicitly described or disclosed. Moreover, reference to the plural is to be construed to refer to the singular, and vice versa.

We claim:

1. An impact protection structure for providing impact energy absorption at a region substantially between a first strengthening member and a second strengthening member of a road vehicle, comprising:

an energy absorbing block arrangement; and a cover arrangement for maintaining the absorbing block arrangement substantially in position during impact, the cover arrangement comprising a strengthening element for focusing in operation an impact force borne by the first member during impact substantially at a center of the absorbing block arrangement;

wherein the first member being a substantially horizontal transverse structural member of the vehicle, the second member being a substantially upright strengthening structure of the vehicle, and the protection structure operable to provide the vehicle with side impact protection for impact forces directed substantially along an elongate axis of the first member;

wherein the energy absorbing block arrangement is operable to undergo substantially non-elastic deformation in absorbing kinetic energy associated with the impact forces;

wherein the absorbing block arrangement includes a first energy absorbing block adapted to occupy a region between an end of the first member and a side of the second member and provide an abutment there between, and a second energy absorbing block adapted to be located within the second member substantially adjacent to the first energy absorbing block.

2. An impact protection structure as claimed in claim 1, wherein the protection structure is adapted to provide impact energy absorption when the first and second members are disposed substantially mutually perpendicularly.

3. An impact protection structure as claimed in claim 1, wherein the second energy absorbing block is adapted to be located so that the second block's center is at a height substantially similar to a height of an upper peripheral edge of the first member and wherein when the first member is coupled via the first block to the second member, the peripheral edge is configured to be subject to a concentration of impact forces during impact situations.

4. An impact protection structure as claimed in claim 1, wherein the cover arrangement is adapted to be maintained in position within the vehicle by way of fasteners.

5. An impact protection structure as claimed in claim 4, wherein the cover arrangement is adapted to be retained in operation by the fasteners at peripheral edges thereof.

6. An impact protection structure as claimed in claim 1, wherein the strengthening element is implemented as a bracket of substantially "L"-shape cross-sectional profile.

7. An impact protection structure as claimed in claim 1, wherein the cover arrangement is fabricated from sheet metal which is cut and bent into required forms.

8. An impact protection structure as claimed in claim 1, wherein the cover arrangement and the absorber block arrangement are at least in part fabricated to be an integral component.

9. An impact protection structure as claimed in claim 1, wherein the absorbing block arrangement comprises one or more energy absorbing blocks fabricated from one or more of a polyolefin, an ABS resin, a polyester resin, and a polypropylene.

10. An impact protection structure as claimed in claim 1, wherein the energy absorbing block arrangement is fabricated from an expanded material foam.

11. An impact protection structure as claimed in claim 10, wherein the expanded material foam includes substantially closed pores therein.

12. An impact protection structure as claimed in claim 10, wherein the expanded material foam includes substantially open pores therein.

13. An impact protection structure as claimed in claim 1, wherein the energy absorbing block arrangement includes at least one block having a generally tapered form, the tapered form being thickest where the at least one block abuts onto the second member and thinnest where the at least one block abuts onto an end of the first member.

14. An impact protection structure as claimed in claim 1, wherein the second energy absorbing block is adapted to be mounted onto a mounting ridge within the second member.

15. An impact protection structure as claimed in claim 1, wherein the first and second members are further provided with a sill member disposed substantially perpendicularly to the first and second members, the protection structure being operable to cooperate with the sill member, the first member and the second member during impact situations.

* * * * *